Oct. 1, 1940.  R. V. GARRETT  2,216,490
NAVIGATIONAL INSTRUMENT
Filed Nov. 21, 1939   2 Sheets-Sheet 1

Inventor
Robert Vance Garrett
By James P. Burns
Attorney

Oct. 1, 1940.  R. V. GARRETT  2,216,490
NAVIGATIONAL INSTRUMENT
Filed Nov. 21, 1939  2 Sheets-Sheet 2
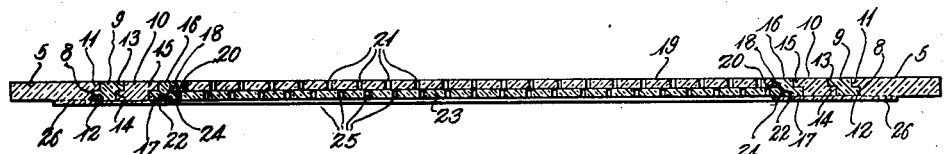
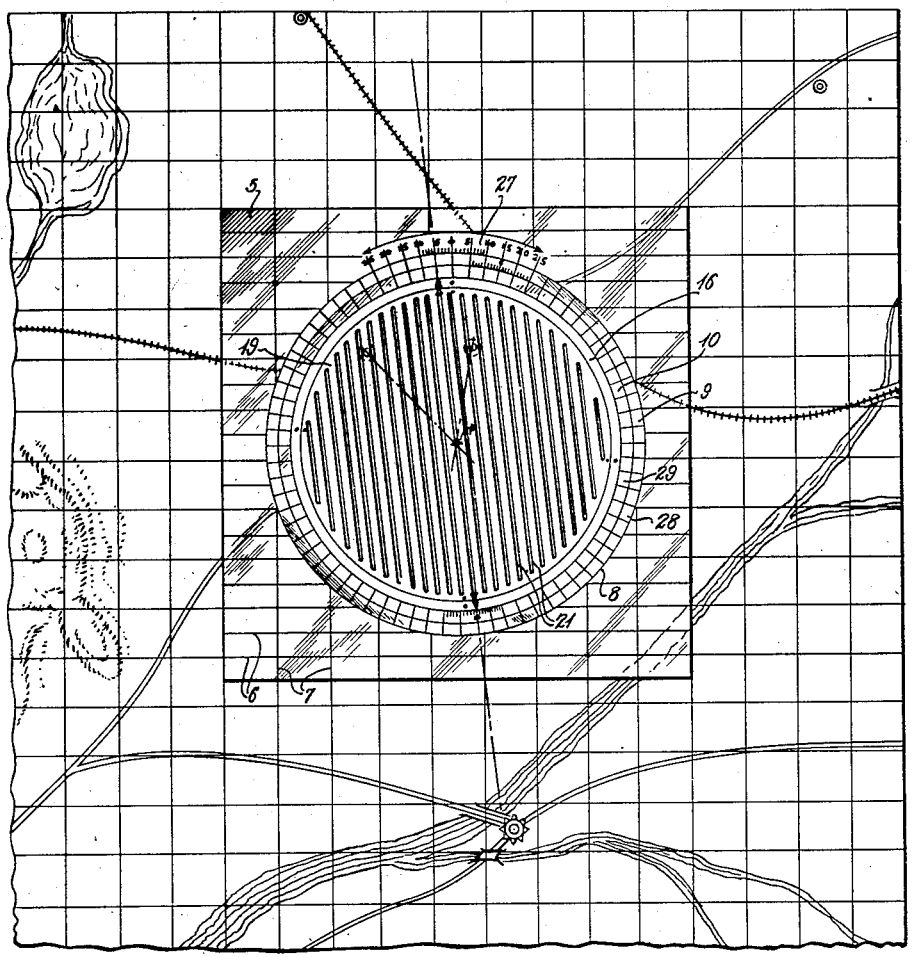
Inventor
Robert Vance Garrett
By James P. Burns
Attorney Patented Oct. 1, 1940

2,216,490

UNITED STATES PATENT OFFICE 2,216,490

NAVIGATIONAL INSTRUMENT

Robert Vance Garrett, Cheyenne, Wyo., assignor to Inland Air Lines, Inc., Casper, Wyo., a corporation of Wyoming Application November 21, 1939, Serial No. 305,551

3 Claims. (Cl. 33—75)

The present invention relates to a navigational instrument for use in ascertaining the unknown position and direction of travel of air or water craft.

More particularly, the invention relates to a navigational instrument to be used in conjunction with a conventional type of map and with which a pilot or navigator may ascertain his craft's position on the map and its direction of travel.

The primary object of my invention is to provide a simple and inexpensive navigational instrument with which a navigator may quickly ascertain his position and direction of travel without the necessity of mathematical calculations, with little or no probability of error.

Other objects and advantages of my invention will be apparent from the following detailed description in which reference is made to the accompanying drawing, wherein—

Figure 3 is a cross sectional view taken along the line 3—3 of Figure 2; and

Figure 4 is a plan view showing the instrument applied to a conventional map and showing the manner of ascertaining the direction of travel of the craft.

For clarity of illustration, like reference characters are used to indicate like parts in each of the views.

Figure 2:
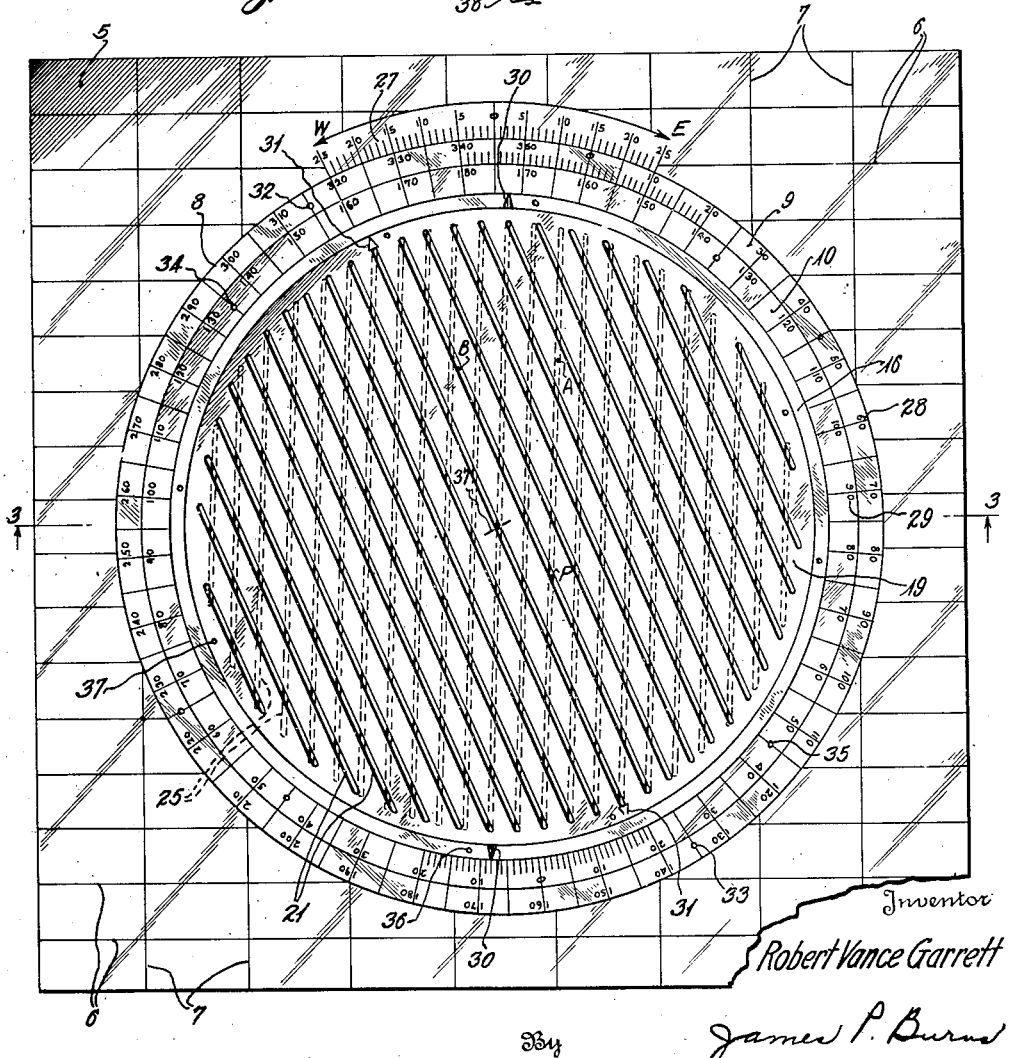
Figure 2 is a plan view of a navigational instrument constructed in accordance with my invention and showing the correct dial and pointer settings for the information obtainable by the method shown in Figure 1.

As is best shown in Figures 2 and 3, an instrument constructed in accordance with the preferred form of my invention comprises a transparent rectangular plate 5 having lines 6 and 7 engraved or otherwise inscribed thereon. The lines 6 and 7 are parallel respectively to the bottom and sides of the rectangular plate 5 and are for the purpose of aligning the instrument in proper parallel relationship to the latitude or longitude lines appearing on conventional maps.

The plate 5 is provided with a central aperture indicated by the reference character 8. Closely fitting within the aperture 8 and adapted to be rotatable therein is an azimuth ring 9. Closely fitted and adapted to rotate within the azimuth ring 9 is a second azimuth ring 10. The rings 9 and 10 are, therefore, rotatable with respect to each other and are independently rotatable with respect to the plate 5.

As shown in Figure 3 the aperture 8 in the plate 5 is provided with an internal flange 11 which has a thickness approximately half that of the plate 5. The flange 11 forms an abutment for the external flange 12 on the ring 9. The ring 9 is also provided with an internal flange 13 which cooperates with an outer flange 14 on the ring 10. The ring 10 is likewise provided with an internal flange 15.

Rotatably fitted within the ring 10 is a ring shaped member 16 which is provided with an external flange 17 which abuts against the flange 15 on the ring 10. The ring shaped member 16 is also provided with an internal flange 18. The plate 5, the azimuth rings 9 and 10 and the ring shaped member 16 are of approximately the same thickness.

Rotatably fitted within the ring shaped member 16 is a transparent disc 19 which has a thickness approximately half that of the ring shaped member 16. The disc 19 has an external flange 20 which abuts against the internal flange 18 on the ring shaped member 16. The disc 19 is provided with a plurality of spaced parallel slots 21.

The lower half of the material defining the aperture in the ring shaped member 16 is counterbored on a taper as indicated at 22. Cemented or otherwise firmly secured within the ring shaped member 16 and below the disc 19 is a second transparent disc 23. The periphery of the disc 23 is tapered as indicated at 24 to correspond with taper 22 in the ring shaped member 16. The disc 23 is also provided with a plurality of parallel slots 25 equal in number to the slots 21 in disc 19 and in identically spaced relationship. It will be apparent that while the disc 13 is not rotatable except in conjunction with the ring shaped member 16, the construction does not interfere with independent rotation of disc 19.

In order to retain the rings 9 and 10 and the ring shaped member 16 in the assembled relationship shown in Figure 3, I provide a flat ring 26 which is cemented or otherwise firmly secured to the plate 5 and which is so proportioned as to underlie the rings 9 and 10 and the ring shaped member 16. It will be understood, however, that the flat ring 26 is secured only to the plate 5 and, therefore, does not interfere with the independent rotation of the members 9, 10, 16 (with 23) and 19.

As best shown in Figure 2, the plate 5 is provided with a scale 27 above the aperture 8. This scale is divided into units of degrees and has the zero indication in the center of the scale. The purpose of the scale 27 is to permit correction for compass deviation from true north.

The azimuth ring 9 is provided on its upper surface with a scale 28 indicating the 360 degrees around the ring. The azimuth ring 10 is provided on its upper surface with a scale 29 divided into 360 degrees but in this case the degrees are numbered from zero degrees to 180 degrees in each direction from the zero point.

On the upper surface of ring shaped member 16, at each end of the slot 25 which passes through the center of the disc 23, there are provided pointers or arrows 30 which may be merely engraved into the surface of the member 16. Likewise, the periphery of the disc 19 is provided with pointers 31 at each end of the slot 21 which passes through the center of the disc 19.

The azimuth ring 9 is drilled at diametrically opposite points to provide sockets 32 and 33 into which a pencil point may be placed to facilitate rotation of ring 9. Ring 10 is likewise drilled to provide sockets 34 and 35 to facilitate rotation of ring 10. Ring-like member 16 is similarly drilled to provide a socket 36 and the periphery of disc 19 is drilled to provide a socket 37 to facilitate rotation of the discs 23 and 19 respectively.

Figure 1:
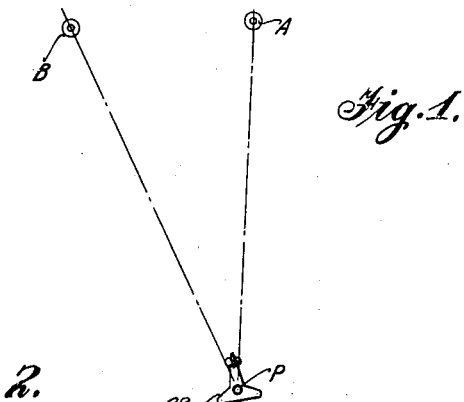
Figure 1 is a diagrammatic view of an aircraft illustrating the taking of directional bearings from two points of known location.

Having thus described the details of my instrument, I will proceed with an explanation of its operation. It is well known in navigation to take bearings from two or more points of known locations and from the information thus obtained and by suitable calculation to ascertain the position of the navigator's craft. These bearings may be taken by sight in some instances but it is now more customary to take radio bearings from stations of known location. Figure 1 shows diagrammatically an airplane 38 in position P taking radio bearing from radio stations A and B. After this information is obtained the navigator may, by the use of the instrument constituting the present invention and a compass, quickly and accurately ascertain his position and direction of travel.

It is well known that magnetic compasses point to magnetic north as distinguished from true or geographic north. Data is available which gives the compass deviation from true north for any particular locality.

The navigator should obtain this information from his data and should rotate azimuth ring 9 until zero degrees on the scale 28 is in alignment with the proper compass deviation as indicated on scale 27. This deviation is shown in Figure 2 to be 15 degrees east of true north.

After this has been done the next step is to ascertain the craft's compass heading and to set zero degrees on scale 29 (azimuth ring 10) to the number of degrees on scale 28 which corresponds to the craft's compass heading. This is shown in Figure 2 to be 160 degrees.

Without disturbing the setting of scales 28 and 29, the ring shaped member 16 is adjusted so that either of the arrows 30 indicate on scale 29 the direction obtained from radio station A. The disc 19 is then likewise adjusted until either of the arrows 31 indicate on scale 29 the direction obtained from radio station B.

After the various parts of the instrument have thus been set they will occupy the positions shown, for example, in Figure 2. The entire instrument is then placed on a conventional map in such a position that the lines 7 are parallel to the lines of longitude appearing on the map while a slot 25 of disc 23 intersects the location on the map of radio station A and a slot 21 of disc 19 intersects the location on the map of radio station B. This position is shown in Figure 2 although, for purposes of clarity, all portions of the map are omitted except the points designating the location of stations A and B and the location of the craft. In Figure 2, it will be noted that the slot 25 of disc 23 which intersects A also intersects at point P the slot 21 of disc 19 which intersects B. This point P designates the position of the craft at the instant the directional bearings were taken. By inserting a pencil point through the two slots at their intersection a mark can be made on the map to indicate the craft's position.

The operation of the instrument is identical under all circumstances and the foregoing example is, therefore, sufficient.

As above indicated, my instrument may also be used to ascertain the direction of travel of the craft. After the position P of the plane has been ascertained, as above outlined, the discs 19 and 23 are rotated until the slots 21 and 25 are parallel and overlie each other and the arrows 30 and 31 point to the craft's compass heading (zero degrees on azimuth ring 10). The entire instrument is then moved on the map until the exact middle of the central slot of the two discs overlies the position P of the plane which has been previously marked on the map with a pencil point as above indicated. I prefer to mark the middle of the central slot 21 with a line as indicated by the reference numeral 37. In positioning the line 37 over the point P, care should be taken to also maintain the lines 7 parallel to the longitude lines on the map.

If then, after the instrument has been so positioned, a line is drawn on the map from the point P along the central grooves toward the zero indication on azimuth ring 10, this line will indicate the direction of travel of the craft. With this information regarding his position at a given time and his direction of travel, a navigator can easily estimate his approximate position a considerable time later without the necessity of taking new bearings and repeating the operation.

It will thus be seen that I have provided a simple and inexpensive navigational instrument which will permit prompt and accurate ascertainment of position and direction of travel and which can be operated by persons having no skill or training as navigators. The very simplicity of my instrument reduces the probability of error. Since direction of travel is indicated on the map by drawing a line from the craft's position toward the compass heading the possibility of an error of 180 degrees in direction of travel is entirely eliminated.

Having thus described my invention, I claim:

1. A navigational instrument for indicating from directional bearings the unknown position of a craft on a map comprising a plate having indicia thereon for aligning said plate with meridian lines on a map, means rotatable with respect to said plate for compensating for compass deviation, a second means rotatable with respect to said first mentioned means for indicating a craft's compass heading, a pair of slotted discs each having a plurality of parallel slots therein, said discs being rotatable with respect to each other and adapted to indicate on said second means the directions to points of known positions, said instrument being adapted to be positioned on a map with said plate in alignment with meridian lines thereon and with a slot of one of said discs intersecting one of said points of known position on said map and a slot of the other of said discs intersecting another of said points of known position on said map whereby the intersection of said two slots will indicate the unknown position of the craft on said map.

2. A navigational instrument for indicating from directional bearings the unknown position of a craft on a map comprising a plate having indicia thereon for aligning said plate with meridian lines on a map, an azimuth ring rotatable with respect to said plate to compensate for compass deviation, a second azimuth ring rotatable with respect to said first mentioned azimuth ring to indicate a compass heading on said first mentioned azimuth ring, a pair of discs each having a plurality of parallel slots therein, said discs being rotatable with respect to said second azimuth ring and with respect to each other to indicate on said second azimuth ring the directions, as ascertained by bearings, to points of known positions, said instrument being adapted to be positioned on a map with said plate in alignment with meridian lines thereon and with a slot of one of said discs intersecting one of said points of known position on said map and a slot of the other of said discs intersecting another of said points of known position on said map whereby the intersection of said two slots will indicate the unknown position of the craft on said map.

3. A navigational instrument for the purpose of indicating on a map the unknown position of a craft and its direction of travel, comprising a plate having an aperture therein, means for orienting said plate on a map, an azimuth ring rotatable within said aperture, a second azimuth ring rotatable within said first mentioned azimuth ring, superimposed transparent discs, each independently rotatable within said second azimuth ring and each having a plurality of elongated parallel openings therein.

ROBERT VANCE GARRETT.